(12) United States Patent
Wang et al.

(10) Patent No.: US 12,154,036 B2
(45) Date of Patent: Nov. 26, 2024

(54) ENHANCED GENERATIVE ADVERSARIAL NETWORK AND TARGET SAMPLE RECOGNITION METHOD

(71) Applicant: SHENZHEN INSTITUTES OF ADVANCED TECHNOLOGY CHINESE ACADEMY OF SCIENCES, Shenzhen (CN)

(72) Inventors: Shuqiang Wang, Shenzhen (CN); Yanyan Shen, Shenzhen (CN); Wenyong Zhang, Shenzhen (CN)

(73) Assignee: SHENZHEN INSTITUTES OF ADVANCED TECHNOLOGY CHINESE ACADEMY OF SCIENCES, Shenzhen (CN)

(*) Notice: Subject to any disclaimer, the term of this patent is extended or adjusted under 35 U.S.C. 154(b) by 980 days.

(21) Appl. No.: 16/999,118

(22) Filed: Aug. 21, 2020

(65) Prior Publication Data

US 2020/0380366 A1 Dec. 3, 2020

Related U.S. Application Data

(63) Continuation of application No. PCT/CN2018/090761, filed on Jun. 12, 2018.

(51) Int. Cl.
*G06N 3/088* (2023.01)
*G06F 18/214* (2023.01)
(Continued)

(52) U.S. Cl.
CPC ......... *G06N 3/088* (2013.01); *G06F 18/2155* (2023.01); *G06F 18/241* (2023.01);
(Continued)

(58) Field of Classification Search
CPC ........ G06N 3/088; G06N 3/045; G06N 3/044; G06N 3/08; G06F 18/2155; G06F 18/2431; G06F 18/241
See application file for complete search history.

(56) References Cited

U.S. PATENT DOCUMENTS

| | | | | |
|---|---|---|---|---|
| 2019/0197358 A1* | 6/2019 | Madani | ................... | G06N 3/045 |
| 2019/0303742 A1* | 10/2019 | Bonnell | ..................... | G06N 3/08 |
| 2020/0285934 A1* | 9/2020 | Hinton | ..................... | G06N 3/09 |

FOREIGN PATENT DOCUMENTS

| | | |
|---|---|---|
| CN | 107180392 A | 9/2017 |
| CN | 107292336 A | 10/2017 |
| CN | 107944370 A | 4/2018 |

OTHER PUBLICATIONS

Zheng—Unlabeled Samples Generated by GAN Improve the Person Re-identification Baseline in vitro—2017 (Year: 2017).*

(Continued)

*Primary Examiner* — Omar F Fernandez Rivas
*Assistant Examiner* — Shamcy Alghazzy

(57) ABSTRACT

The present disclosure relates to an enhanced generative adversarial network and a target sample recognition method. The enhanced generative adversarial network in the present disclosure includes at least one enhanced generator and at least one enhanced discriminator, where the enhanced generator obtains generated data by processing initial data, and provides the generated data to the enhanced discriminator; the enhanced discriminator processes the generated data and feeds back a classification result to the enhanced generator; the enhanced discriminator includes: a convolution layer, a basic capsule layer, a convolution capsule layer, and a classification capsule layer, and the convolution layer, the basic capsule layer, the convolution capsule layer, and the classification capsule layer are sequentially connected to each other.

12 Claims, 3 Drawing Sheets

(51) Int. Cl.
    *G06F 18/241*     (2023.01)
    *G06F 18/2431*     (2023.01)
    *G06N 3/044*     (2023.01)
    *G06N 3/045*     (2023.01)
    *G06N 3/08*     (2023.01)

(52) U.S. Cl.
    CPC ......... *G06F 18/2431* (2023.01); *G06N 3/044* (2023.01); *G06N 3/045* (2023.01); *G06N 3/08* (2013.01)

(56) References Cited

OTHER PUBLICATIONS

Denton—deep-generative-image-models-using-a-laplacian-pyramid-of-adversarial-networks-Paper—2015 (Year: 2015).*
Saqur—CapsGAN Using Dynamic Routing for Generative Adversarial Networks—2018 (Year: 2018).*
Wang—CapsNet and Triple GANs Towards Hyperspectral Classification—2018 (Year: 2018).*
Upadhyay—Generative Adversarial Network Architectures For Image Synthesis Using Capsule Networks—2018 (Year: 2018).*
Jaiswal—CapsuleGAN Generative Adversarial Capsule Network—2018 (Year: 2018).*
The History Began from AlexNet A Comprehensive Survey on Deep Learning Approaches (Year: 2018).*
Comparing Generative Adversarial Network Techniques for Image Creation and Modification (Year: 2018).*
International Search Report issued in corresponding International application No. PCT/CN2018/090761, mailed Mar. 18, 2019(7 pages).
International Search Authority issued in corresponding international application No. PCT/CN2018/090761, mailed Mar. 18, 2019(3 pages).

* cited by examiner

ENHANCED GENERATIVE ADVERSARIAL NETWORK AND TARGET SAMPLE RECOGNITION METHOD

CROSS-REFERENCE TO RELATED APPLICATIONS

This application is a continuation of co-pending International Patent Application No. PCT/CN2018/090761 filed on Jun. 12, 2018, the entire contents of which are incorporated herein by reference.

TECHNICAL FIELD

The present disclosure relates to the field of computer application technologies, and in particular, to an enhanced generative adversarial network and a target sample recognition method.

BACKGROUND

In recent years, a generative adversarial network (GAN) has received extensive attention and application in unsupervised learning with complex distribution. The GAN is a deep learning model. The model includes two modules: a generator model (G) and a discriminator model (D). The GAN generates a fairly good output through mutual game learning of a generator and a discriminator. The generator and the discriminator each usually include a multilayer network that includes a convolution layer and/or a fully connected layer. The generator and the discriminator need to be differentiable, but are not necessarily directly reversible. A training objective of the GAN is to obtain a parameter that maximizes classification accuracy of the discriminator and to obtain a parameter of the generator that deceives the discriminator to the utmost extent. In a training process, a network weight of one party is kept unchanged, and a network weight of the other party is updated, and this is alternately performed for the two parties to iteratively optimize networks of the two parties to form a competition until a dynamic balance (Nash equilibrium) is achieved between the two parties. In this case, the generator model G restores distribution of training data, that is, distribution of generated data is highly similar to that of real data, and is difficult for the discriminator model D to recognize.

A deep convolutional generative adversarial network (DCGAN) mainly has the following improvements to the conventional GAN: (1) A constraint is added based on a convolutional GAN topology. (2) A trained discrimination network is applied to an image classification task. (3) A convolution kernel is visualized. (4) A vector operation attribute of a generator model is fully used, and it is easy to control a multi-semantic feature of a generated sample.

The prior art mainly has the following disadvantages: (1) The deep learning model, especially the widely applied convolutional neural network model, needs a large quantity of training samples to show its advantages. However, in some fields, there are few labeled high-quality samples. For example, in the medical imaging field, a large quantity of labeled high-quality samples are scarce for any disease. The existing deep convolutional neural network model cannot be fully trained without sufficient training samples, which greatly limits application of the deep convolutional neural network model in the medical imaging field. (2) A semi-supervised learning model, especially a GAN-based semi-supervised learning model, is a feasible solution to the foregoing problem. The semi-supervised learning model can learn overall data distribution by using limited labeled samples. However, the existing GAN model usually has the following problems: (a) It is difficult to train the GAN, especially when there are multiple classes of data with complex distribution. (b) It is easy for the GAN to cause a model to collapse, resulting in failure of the generator model.

SUMMARY

The present disclosure provides an enhanced generative adversarial network and a target sample recognition method, to resolve at least one of the foregoing technical problems in the prior art to some extent.

To resolve the foregoing problem, the present disclosure provides the following technical solutions:

An enhanced generative adversarial network includes at least one enhanced generator and at least one enhanced discriminator, where the enhanced generator obtains generated data by processing initial data, and provides the generated data to the enhanced discriminator; the enhanced discriminator processes the generated data and feeds back a classification result to the enhanced generator; the enhanced discriminator includes: a convolution layer, a basic capsule layer, a convolution capsule layer, and a classification capsule layer, and the convolution layer, the basic capsule layer, the convolution capsule layer, and the classification capsule layer are sequentially connected to each other.

The technical solution used in embodiments of the present disclosure further includes: the enhanced generator obtains the generated data by using an unpooling layer, linear rectification, and a filtering layer to process the initial data.

The technical solution used in the embodiments of the present disclosure further includes: quantities and structure parameters of the convolution layer, the basic capsule layer, the convolution capsule layer, and the classification capsule layer are set according to feature of a target sample.

The technical solution used in the embodiments of the present disclosure further includes: there is more than one enhanced generator, there is more than one enhanced discriminator, the multiple enhanced generators generate new sample data by classification, and the more than one enhanced discriminator performs classification prediction on an unlabeled sample by forming an enhanced discriminator array.

Another technical solution used in the embodiments of the present disclosure is a target sample recognition method, including:

step a: constructing an enhanced generative adversarial network, where the constructed enhanced generative adversarial network includes at least one enhanced generator and at least one enhanced discriminator; and step b: constructing a multi-channel generative adversarial network based on the constructed enhanced generative adversarial network and a class feature of a target sample, performing label prediction on unlabeled data by using a trained multi-channel generative adversarial network, generating a sample of a corresponding class based on the enhanced generator, and accurately recognizing the target sample by utilizing the enhanced discriminator.

The technical solution used in the embodiments of the present disclosure further includes: in step a, the enhanced generator obtains generated data by processing initial data, and provides the generated data to the enhanced discriminator, and the enhanced discriminator processes the generated data and feeds back a classification result to the enhanced generator.

The technical solution used in the embodiments of the present disclosure further includes: in step a, the enhanced discriminator includes: a convolution layer, a basic capsule layer, a convolution capsule layer, and a classification capsule layer, and the convolution layer, the basic capsule layer, the convolution capsule layer, and the classification capsule layer are sequentially connected to each other.

The technical solution used in the embodiments of the present disclosure further includes: step a includes: designing the enhanced discriminator based on a capsule mechanism by utilizing a capsule feature vectorization expression pattern; designing a "generation-discrimination" alternating optimization solution based on a Nash equilibrium capability of an enhanced generative adversarial model; and designing an objective function of the model by utilizing labeled and unlabeled samples.

The technical solution used in the embodiments of the present disclosure further includes: step b includes: classifying labeled raw data by class, and performing a data augmentation operation on each class of data; training an enhanced discriminator network; performing network training on the enhanced generator; inputting noise data, and generating new labeled data by using the enhanced generator; performing class prediction on the unlabeled data by using the enhanced discriminator; and classifying the target sample based on the discriminator in the multi-channel generative adversarial network.

The technical solution used in the embodiments of the present disclosure further includes: the performing class prediction on the unlabeled data by using the enhanced discriminator includes: selecting any piece of data from an unlabeled raw disease data set, and inputting the any piece of data into each class of discriminator, where each discriminator determines a class of the data, and outputs a number between 0 and 1, a number closer to 1 means a higher confidence level indicating that the class is determined, and if there are multiple output values close to 1, it indicates that training of the generator does not reach an optimal state, and training needs to continue.

Compared with the prior art, the embodiments of the present disclosure achieve the following beneficial effects: According to the enhanced generative adversarial network and the target sample recognition method in the embodiments of the present disclosure, a pattern recognition problem can be effectively resolved when there is a small quantity of labeled samples, and a target sample can be accurately recognized. Based on the enhanced generative adversarial network and the target sample recognition method in the embodiments of the present disclosure, new sample data is generated by class by using the multiple enhanced generators in the multi-channel generative adversarial network; and the multiple enhanced discriminators in the multi-channel generative adversarial network can be used to perform classification prediction on an unlabeled sample by forming an enhanced discriminator array. In this way, an amount of labeled data is increased, and it is easier to train a complex deep convolutional neural network classifier. Compared with the prior art, the enhanced generative adversarial network and the target sample recognition method in the embodiments of the present disclosure have the following significant features and positive effects: The multi-channel generative adversarial network is trained, so that the multiple enhanced generators respectively learn sub-distribution of different classes of data in an original database, which makes it easier for network training to achieve Nash equilibrium and makes it easier to train the generative adversarial network. An amount of labeled data can be increased significantly by using the multiple enhanced generators in the multi-channel generative adversarial network and the corresponding enhanced discriminator array, thereby resolving the problem, in some fields such as the medical imaging field, that it is difficult to obtain a large amount of labeled high-quality data, and making it more convenient to train a classification model based on a deep convolutional neural network.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely intended to explain this application, but are not intended to limit this application.

Figure 1:
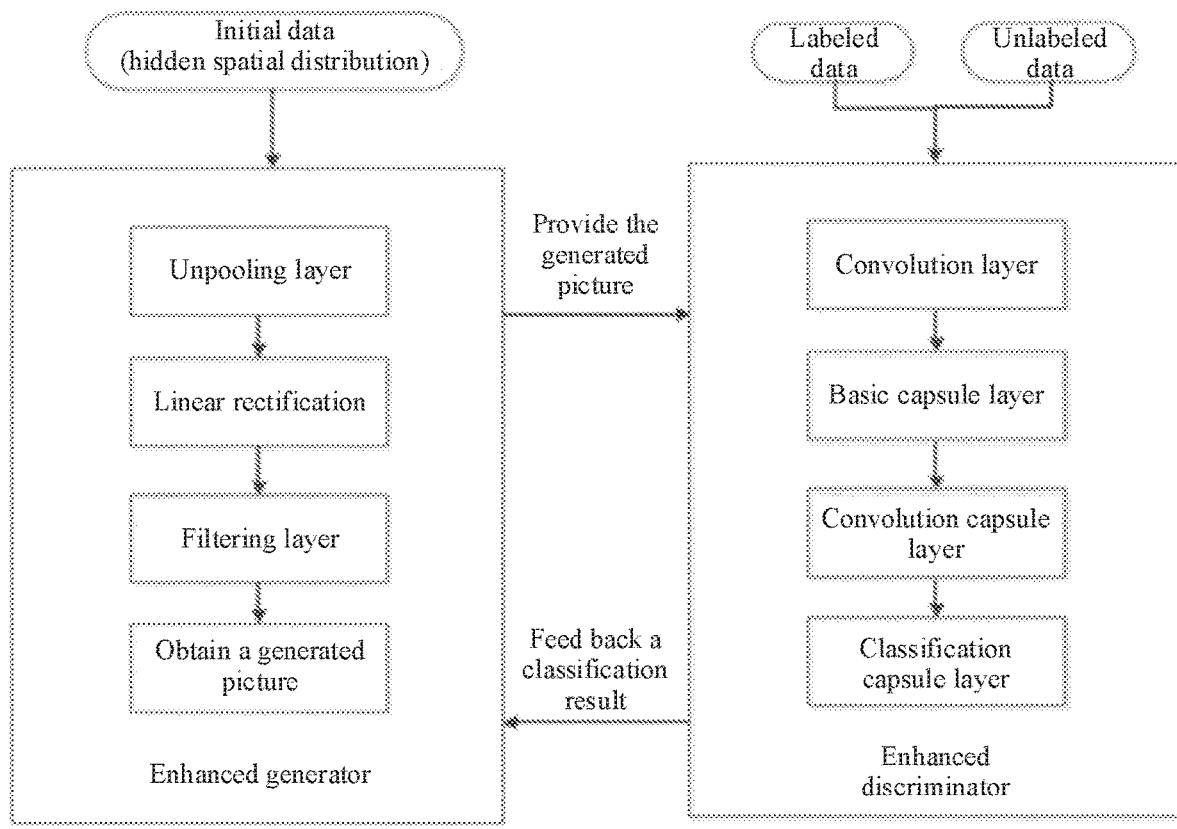
FIG. 1 is a schematic structural diagram of an enhanced generative adversarial network according to a first embodiment of the present disclosure.

FIG. 1 is a schematic structural diagram of an enhanced generative adversarial network according to a first embodiment of the present disclosure. The enhanced generative adversarial network in this embodiment of the present disclosure includes an enhanced generator and an enhanced discriminator. The enhanced generator obtains generated data by using an unpooling layer, linear rectification, and a filtering layer to process initial data, and provides the generated data to the enhanced discriminator. The enhanced discriminator processes the data and feeds back a classification result to the enhanced generator. The generated data may be a generated picture or another class of data. The enhanced discriminator includes: a convolution layer, a basic capsule layer, a convolution capsule layer, and a classification capsule layer, and the convolution layer, the basic capsule layer, the convolution capsule layer, and the classification capsule layer are sequentially connected to each other. Quantities and structure parameters of the convolution layer, the basic capsule layer, the convolution capsule layer, and the classification capsule layer are set according to a feature of a target sample.

In the enhanced generative adversarial network in this embodiment of the present disclosure, the enhanced discriminator based on a capsule mechanism is provided based on an existing deep convolutional generative adversarial network, and a direction information feature and a layer information feature of a sample are expressed through vectorization to improve a sample feature expression capability and a feature recognition capability of the discriminator, thereby improving a capability of the generator to learn overall distribution of real data.

Figure 2:
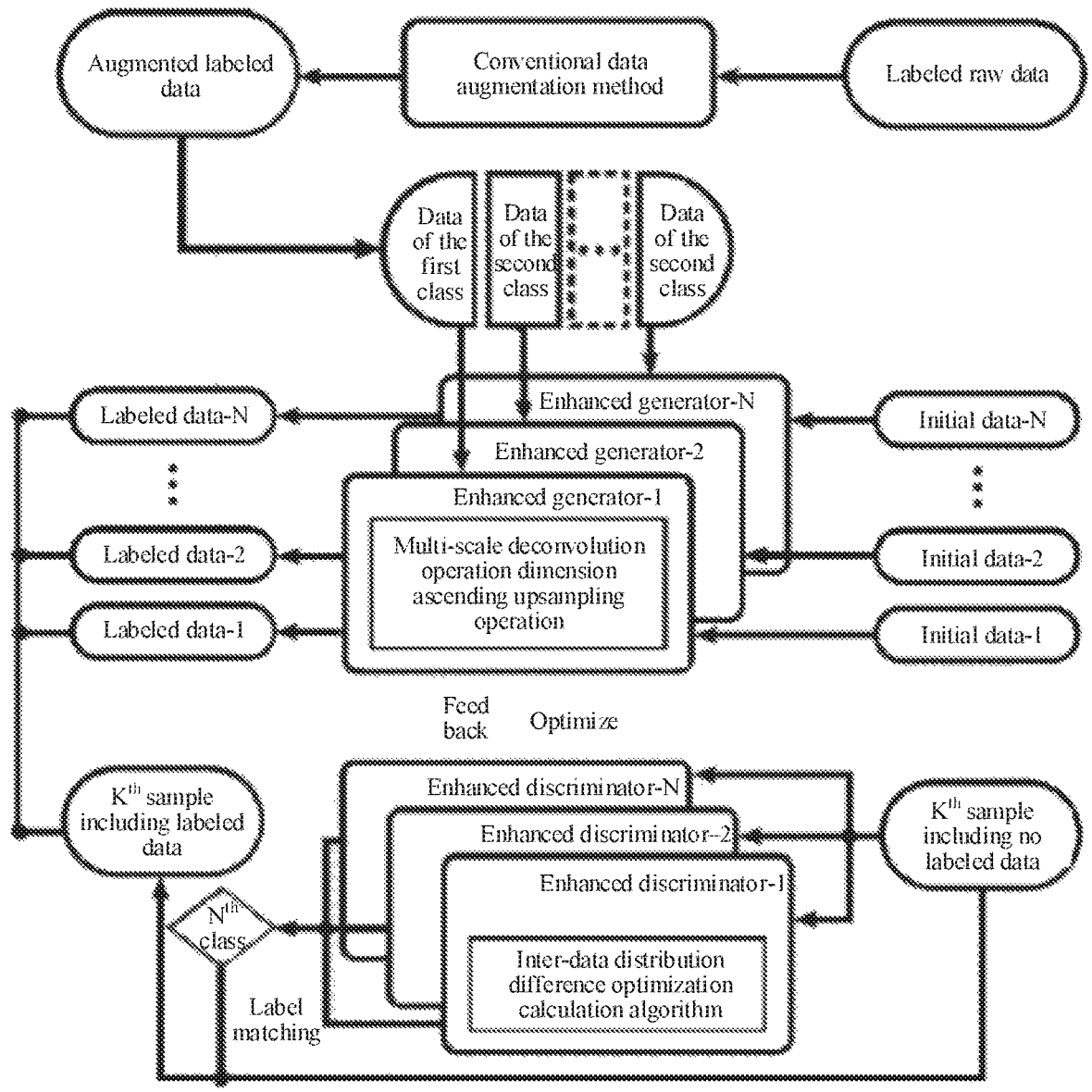
FIG. 2 is a schematic structural diagram of an enhanced generative adversarial network according to a second embodiment of the present disclosure.

FIG. 2 is a schematic structural diagram of an enhanced generative adversarial network according to a second embodiment of the present disclosure. Based on the enhanced generative adversarial network in this embodiment of the present disclosure, N enhanced generative adversarial networks are constructed to form a multi-channel generative adversarial network, so that each enhanced generator ($G_i$, i=1, ..., W) needs to learn distribution ($\varphi_i$) only of a real sample of a corresponding class. In comparison with a common generator that needs to learn overall distribution ($\varphi$) of all samples, in the enhanced generative adversarial network in this embodiment of the present disclosure, it is easier for N enhanced generators to reach a Nash equilibrium state. In this way, the problem that it is difficult to train the generative adversarial network is alleviated, and universality of the generative adversarial network is improved. An optimal discriminator ($D_i^{opt}$, i=1, ..., N) and an optimal generator ($G_i^{opt}$, i=1, ..., N) can be obtained after multiple iterations of training. Labeled high-quality data can be generated by class by using the optimal multi-channel generator:

$$X_i^{new} = G_i^{opt}(Z_i), i=1 \ldots N, \text{ where}$$

$X_i^{new}$ represents newly generated data of the $i^{th}$ class, and $Z_i$ represents initialization noise of the $i^{th}$ class. In addition, label prediction can be performed on any unlabeled data ($\tilde{x}$) by using the optimal multi-channel discriminator:

$$0 \leq D_i^{opt}(\tilde{x}) \leq 1, i = 1 \ldots N$$
$$y_k = \underset{i}{\operatorname{argmax}}\{D_1^{opt}(\tilde{x}), \ldots D_i^{opt}(\tilde{x}), \ldots D_N^{opt}(\tilde{x})\}.$$

Based on the enhanced generative adversarial network in this embodiment of the present disclosure, new sample data is generated by class by using multiple enhanced generators in the multi-channel generative adversarial network; and multiple enhanced discriminators in the multi-channel generative adversarial network can be used to perform classification prediction on an unlabeled sample by forming an enhanced discriminator array. In this way, an amount of labeled data is increased, and it is easier to train a complex deep convolutional neural network classifier.

Figure 3:
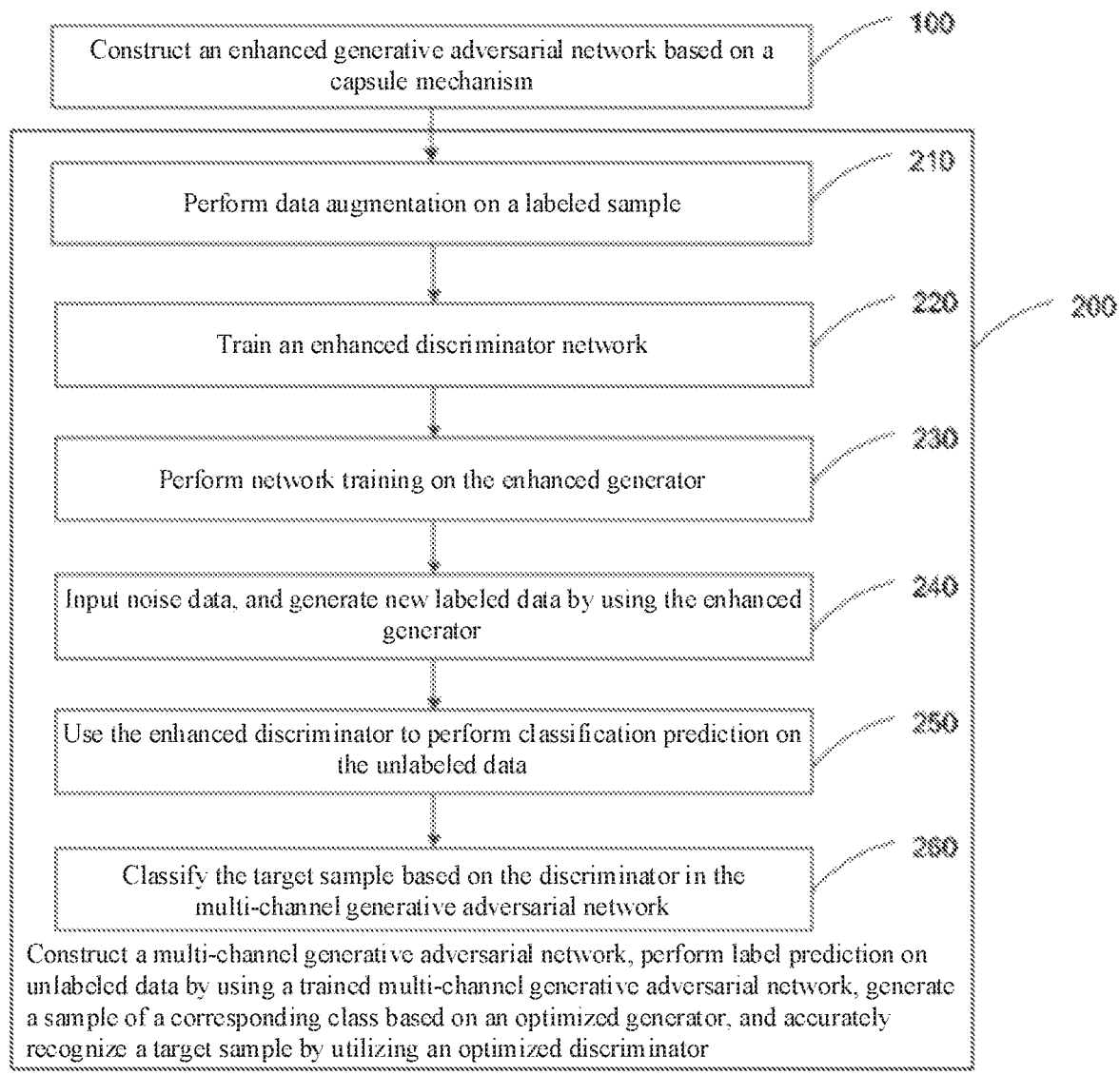
FIG. 3 is a flowchart of a target sample recognition method according to an embodiment of the present disclosure.

FIG. 3 is a flowchart of a target sample recognition method according to an embodiment of the present disclosure. The target sample recognition method in this embodiment of the present disclosure includes the following steps.

Step 100: Construct an enhanced generative adversarial network based on a capsule mechanism.

Step 100 specifically includes: first, designing an enhanced discriminator based on the capsule mechanism, using a capsule feature vectorization expression pattern to improve a feature extraction capability and a feature recognition capability of a discriminator, and further propagating gradient information to improve a capability of a generator to learn overall sample distribution, thereby improving a discrimination capability and a generation capability of an entire generative adversarial model; then, designing an appropriate "generation-discrimination" alternating optimization solution to improve a capability of the enhanced generative adversarial model to achieve Nash equilibrium and to improve robustness of the model; and finally, designing an objective function of the model, so that the model can fully use labeled and unlabeled samples to improve a capability of the model to quickly learn overall data distribution when there are limited labeled samples and to implement accurate sample recognition.

In this solution, the enhanced discriminator based on the capsule mechanism is provided based on an existing deep convolutional generative adversarial network, and a direction information feature and a layer information feature of a sample are expressed through vectorization to improve a sample feature expression capability and a feature recognition capability of the discriminator, thereby improving a capability of the generator to learn overall distribution of real data. FIG. 1 is a schematic structural diagram of an enhanced generative adversarial network. The enhanced generative adversarial network includes an enhanced generator and an enhanced discriminator. The enhanced generator obtains a generated picture by using an unpooling layer, linear rectification, and a filtering layer to process initial data, and provides the generated picture to the enhanced discriminator. The enhanced discriminator processes the picture and feeds back a classification result to the enhanced generator. The enhanced discriminator includes: a convolution layer, a basic capsule layer, a convolution capsule layer, and a classification capsule layer, and the convolution layer, the basic capsule layer, the convolution capsule layer, and the classification capsule layer are sequentially connected to each other. Quantities and structure parameters of the layers are set according to a feature of a target sample.

Step 200: Construct a multi-channel generative adversarial network, perform label prediction on unlabeled data by using a trained multi-channel generative adversarial network, generate a sample of a corresponding class based on an optimized generator, and accurately recognize a target sample by utilizing an optimized discriminator.

In step 200, first, the multi-channel enhanced generative adversarial network is designed based on the enhanced generative adversarial network for a class feature of the target sample, and each channel of generative adversarial network is trained by using a different class of sample; then, label prediction is performed on the unlabeled data by using the trained multi-channel generative adversarial network, and the sample of the corresponding class is generated by using the optimized generator, to obtain more labeled samples; and finally, the target sample is accurately recognized by using the optimized discriminator.

Referring to FIG. 3, for ease of solution description, in this solution, it is assumed that there are N sample classes, and for a data set $\chi=\{X_1, X_2, \ldots, X_N\}$ including N classes, overall distribution of the data set $\chi$ is subject to distribution $\chi\sim\varphi$. Each class of data subset can be expressed as $X_i=\{x_i^1, x_i^2, \ldots, x_i^i, \ldots\}$, and is subject to distribution $X_{i\sim\varphi_i}$, where i=1, ..., N. N enhanced generative adversarial networks are constructed to form a multi-channel generative adversarial network, so that each enhanced generator ($G_i$, i=1, ..., N) needs to learn distribution ($\varphi_i$) only of a real sample of a corresponding class.

Step 200 specifically includes the following steps.

Step 210: Perform data augmentation on a labeled sample.

In step 210, labeled raw data is classified by class, and a common data augmentation operation is performed on each class of data. The data augmentation operation includes flipping, rotation, zooming in/out, and the like. An extended data set is enough to train the corresponding multi-channel generative adversarial network.

Step 220: Train an enhanced discriminator network.

In step 220, for a sample including N classes, N generative adversarial networks are trained one by one in a model training process. For the $i^{th}$ channel of generative adversarial network, only data of the corresponding $i^{th}$ class is input. For the $i^{th}$ channel of generative adversarial network, a corresponding objective function for training an optimal discriminator is as follows:

$$D_{opt} = \underset{D}{\arg\min} \text{Loss}(D) = \underset{D}{\arg\max} V(G, D)$$

$$V(G, D) = E_{x \sim P_{data}}(D(x)) - E_{\tilde{x} \sim P_G}(D(\tilde{x})) - \lambda E_{\hat{x} \sim P_{penalty}}(\|\nabla_{\hat{x}} D(x)\| - 1)^2,$$

where

Loss(G) represents a loss function of the generator G. The loss function measures a difference between real data ($P_{data}$(x)) and generated data ($P_G$(x)). A parameter $\theta_D$ of the discriminator network D is initialized, and a quantity $n_D$ of iterations of training the discriminator is set. When the discriminator D is trained, in each iteration, several pieces of data $\{x^1, x^2, x^3, \ldots, x^m\}$ are sampled from the real data, and several pieces of data $\{z^1, z^2, z^3, \ldots, z^m\}$ (normal distribution or uniform distribution) are sampled from noise data. Then, several pieces of generated data $\{\tilde{x}^1, \tilde{x}^2, \tilde{x}^3, \ldots \tilde{x}^m\}$ are obtained by using the generator, where $\tilde{x}^i = G(z^i)$, several pieces of penalty data $\{\hat{x}^1, \hat{x}^2, \hat{x}^3, \ldots \hat{x}^m\}$ are calculated, where $\hat{x}^i = \in x^i + (1-\in) \tilde{x}^i$, and $\in$ is a random number between 0 and 1, and then the parameter can be updated:

$$\theta_D \leftarrow \theta_D + \eta \cdot \nabla_{\theta_D} \tilde{V}(G, D).$$

The enhanced discriminator can have better performance after $n_D$ iterations of training. The remaining (N−1) enhanced discriminators are trained by using the same method to form an enhanced discriminator group that includes the N enhanced discriminators.

Step 230: Perform network training on the enhanced generator.

In step 230, the multi-channel generative adversarial network also includes N enhanced generators. Training data is classified into N classes by class, and each class of data is used to train a corresponding enhanced generator. An objective function for training an optimal generator is as follows:

$$G_{opt} = \underset{G}{\arg\min} \underset{D}{\max} V(G, D),$$

where the meaning of V(G, D) is the same as that in step 220. In a process of finding the optimal generator, a parameter $\theta_G$ of a generator network G needs to be first initialized, and a quantity $n_G$ of iterations of training the generator needs to be first set. Several pieces of data $\{z^1, z^2, z^3, \ldots, z^m\}$ (normal distribution or uniform distribution) are then sampled from the noise data, and then the parameter can be updated:

$$\theta_G \leftarrow \theta_G - \eta \cdot \nabla_{\theta_G} \tilde{V}(G, D).$$

Then, step 210 is performed again for a new iteration, and $n_G$ iterations and updates are performed in total, so that the enhanced generator can have optimal performance other classes of CSM generators are trained by using the same method to obtain a group of enhanced generators.

Step 240: Input noise data and generate new labeled data by using the enhanced generator.

In step 240, after the trained multi-channel generative adversarial network is obtained, all the enhanced generators ($G_i^{opt}$, i=1, ..., N) are selected. For each enhanced network, one group of noise data (Gaussian distribution, uniform distribution, or the like) is input to generate a group of new labeled data, and a label class of the group of new labeled data is a class corresponding to the generator:

$$X_i^{new} = G_i^{opt}(Z_i), i=1 \ldots N, \text{ where}$$

$X_i^{new}$ represents newly generated data of the $i^{th}$ class, and $Z_i$ represents initialization noise of the $i^{th}$ class. By analogy, new labeled data can be generated after the same operation is performed on a generator. In this way, an amount of each class of data can be increased, and a data set is also extended.

Step 250: Perform class prediction on the unlabeled data by using the enhanced discriminator.

In step 250, after the trained multi-channel generative adversarial network is obtained, all the discriminators ($D_i^{opt}$, i=1, ..., N) are selected. Any piece of data ($\tilde{x}$) is selected from an unlabeled raw disease data set, and is input into each class of discriminator. Each discriminator determines a class ($y_1, y_2, \ldots, y_N$) of the data, and outputs a number between 0 and 1. A number closer to 1 means a higher confidence level indicating that the class is determined. Ideally, for all the discriminators, only one output value is close to 1, and the other output values are all close to 0. In this way, it can be determined that the class of the input data is a class with a maximum output value. If there are multiple output values close to 1, it indicates that training of the generator does not reach an optimal state, and training needs to continue.

$$0 \leq D_i^{opt}(\tilde{x}) \leq 1, i = 1 \ldots N$$

$$y_k = \underset{i}{\arg\max} \{D_1^{opt}(\tilde{x}), \ldots D_i^{opt}(\tilde{x}), \ldots D_N^{opt}(\tilde{x})\}$$

By analogy, each piece of unlabeled data in the original data set becomes labeled data after the foregoing operation is performed on the unlabeled data. In this way, an amount of labeled data in the data set is increased, and the data set is also extended.

Step 260: Classify the target sample based on the discriminator in the multi-channel generative adversarial network.

In step 260, the trained multi-channel generative adversarial network includes the N enhanced generative adversarial networks. All the enhanced discriminators are selected to form an enhanced discriminator array ($D^s$, s=1, ..., N). The N enhanced discriminators respectively correspond to N classes of disease data. These enhanced discriminators can directly perform classification prediction on a test sample. In a test phase, any test sample ($d_k$) is selected and is input into each enhanced discriminator ($D^s$). Each enhanced discriminator ($D^s$) correspondingly outputs a number between 0 and 1 for the input sample ($d_k$). A larger number indicates a higher confidence level indicating that the discriminator determines a class of the test sample as a corresponding class. Normally, for output values from the N enhanced discriminators for a test sample, only one output value (for example, $D^i$) is close to 1, and the other output values are all close to 0. It can be learned from the foregoing analysis that the class of the test sample ($d_k$) is predicted as a sample of the $j^{th}$ class of a disease. Based on the foregoing method, the foregoing operation can be repeated for each test sample in a test set, to classify each sample.

For limited labeled samples, the enhanced generative adversarial network based on the capsule mechanism is provided in the enhanced generative adversarial network and the target sample recognition method in the embodiments of the present disclosure. In the network, an image feature is expressed by using the vectorization pattern, which significantly improves a recognition capability of the discriminator for real samples and generated samples, thereby improving a capability of the generator to learn overall distribution of real data, and making it easier for the generative adversarial model to achieve Nash equilibrium.

Based on the enhanced generative adversarial network, the multi-channel generative adversarial model is further provided in the enhanced generative adversarial network and the target sample recognition method in the embodiments of the present disclosure. For a data set $\chi=\{(X_1, X_2, \ldots, X_N\}$ including N classes, overall distribution of the data set $\chi$ is subject to distribution $\chi-\varphi$. Each class of data subset can be expressed as $X_i=\{x_i^1, x_i^2, \ldots, x_i^i, \ldots\}$, and is subject to distribution $X_{i-\varphi_i}$, where $i=1, \ldots, N$. N enhanced generative adversarial networks are constructed to form a multi-channel generative adversarial network, so that each enhanced generator ($G_i$, $i=1, \ldots, N$) needs to learn distribution ($\varphi_i$) only of a real sample of a corresponding class. In comparison with a common generator that needs to learn overall distribution ($\varphi$) of all samples, in the method of the present disclosure, it is easier for N enhanced generators to reach a Nash equilibrium state. In this way, the problem that it is difficult to train the generative adversarial network is alleviated, and universality of the generative adversarial network is improved. An optimal discriminator ($D_i^{opt}$, $i=1, \ldots, N$) and an optimal generator ($G_i^{opt}$, $i=1, \ldots, N$) can be obtained after multiple iterations of training. Labeled high-quality data can be generated by class by using the optimal multi-channel generator:

$$X_i^{new}=G_i^{opt}(Z_i), i=1 \ldots N, \text{where}$$

$X_i^{new}$ represents newly generated data of the $i^{th}$ class, and $Z_i$ represents initialization noise of the $i^{th}$ class. In addition, label prediction can be performed on any unlabeled data ($\tilde{x}$) by using the optimal multi-channel discriminator:

$$0 \le D_i^{opt}(\tilde{x}) \le 1, i = 1 \ldots N$$
$$y_k = \underset{i}{\operatorname{argmax}}\{D_1^{opt}(\tilde{x}), \ldots D_i^{opt}(\tilde{x}), \ldots D_N^{opt}(\tilde{x})\}.$$

According to the enhanced generative adversarial network and the target sample recognition method in the embodiments of the present disclosure, a pattern recognition problem can be effectively resolved when there is a small quantity of labeled samples, and a target sample can be accurately recognized.

Based on the enhanced generative adversarial network and the target sample recognition method in the embodiments of the present disclosure, new sample data is generated by class by using the multiple enhanced generators in the multi-channel generative adversarial network; and the multiple enhanced discriminators in the multi-channel generative adversarial network can be used to perform classification prediction on an unlabeled sample by forming an enhanced discriminator array. In this way, an amount of labeled data is increased, and it is easier to train a complex deep convolutional neural network classifier.

Compared with the prior art, the enhanced generative adversarial network and the target sample recognition method in the embodiments of the present disclosure have the following significant features and positive effects: The multi-channel generative adversarial network is trained, so that the multiple enhanced generators respectively learn sub-distribution of different classes of data in an original database, which makes it easier for network training to achieve Nash equilibrium and makes it easier to train the generative adversarial network. An amount of labeled data can be increased significantly by using the multiple enhanced generators in the multi-channel generative adversarial network and the corresponding enhanced discriminator array, thereby resolving the problem, in some fields such as the medical imaging field, that it is difficult to obtain a large amount of labeled high-quality data, and making it more convenient to train a classification model based on a deep convolutional neural network.

The present disclosure is described with reference to current preferred implementations. However, it should be understood by a person skilled in the art that the foregoing preferred implementations are merely intended to describe the present disclosure, and are not intended to limit the protection scope of the present disclosure. Any modification, equivalent replacement, or improvement made without departing from the spirit and the principle of the present disclosure shall fall within the protection scope of the present disclosure.

What is claimed is:

1. An enhanced generative adversarial network, comprising at least one enhanced generator and at least one enhanced discriminator, wherein: the enhanced generator obtains generated data by processing initial data, and provides the generated data to the enhanced discriminator; the enhanced discriminator processes the generated data and feeds back a classification result to the enhanced generator; the enhanced discriminator comprises: a convolution layer, a basic capsule layer, a convolution capsule layer, and a classification capsule layer, and the convolution layer, the basic capsule layer, the convolution capsule layer, and the classification capsule layer are sequentially connected to each other; wherein quantities and structure parameters of the convolution layer, the basic capsule layer, the convolution capsule layer, and the classification capsule layer are set according to a feature of a target sample;

wherein there is more than one enhanced generator, there is more than one enhanced discriminator, the more than one enhanced generator generates new sample data by classification, and the more than one enhanced discriminator performs classification prediction on an unlabeled sample by forming an enhanced discriminator array.

2. The enhanced generative adversarial network according to claim 1, wherein the enhanced generator obtains the generated data by using an unpooling layer, linear rectification, and a filtering layer to process the initial data.

3. A target sample recognition method using the enhanced generative adversarial network, comprising:
   step a: constructing an enhanced generative adversarial network, wherein the constructed enhanced generative adversarial network comprises at least one enhanced generator and at least one enhanced discriminator; and
   step b: constructing a multi-channel generative adversarial network based on the constructed enhanced generative adversarial network and a class feature of a target sample, performing label prediction on unlabeled data by using a trained multi-channel generative adversarial network, generating a sample of a corresponding class based on the enhanced generator, and accurately recognizing the target sample by utilizing the enhanced discriminator,
   wherein step b comprises: classifying labeled raw data by class, and performing a data augmentation operation on each class of data; training an enhanced discriminator network; performing network training on the enhanced generator; inputting noise data, and generating new labeled data by using the enhanced generator; performing class prediction on the unlabeled data by using the enhanced discriminator; and classifying the target sample based on the discriminator in the multi-channel generative adversarial network.

4. The target sample recognition method according to claim 3, wherein in step a, the enhanced generator obtains generated data by processing initial data, and provides the generated data to the enhanced discriminator, and the enhanced discriminator processes the generated data and feeds back a classification result to the enhanced generator.

5. The target sample recognition method according to claim 3, wherein in step a, the enhanced discriminator comprises: a convolution layer, a basic capsule layer, a convolution capsule layer, and a classification capsule layer, and the convolution layer, the basic capsule layer, the convolution capsule layer, and the classification capsule layer are sequentially connected to each other.

6. The target sample recognition method according to claim 4, wherein in step a, the enhanced discriminator comprises: a convolution layer, a basic capsule layer, a convolution capsule layer, and a classification capsule layer, and the convolution layer, the basic capsule layer, the convolution capsule layer, and the classification capsule layer are sequentially connected to each other.

7. The target sample recognition method according to claim 3, wherein step a comprises: designing the enhanced discriminator based on a capsule mechanism by utilizing a capsule feature vectorization expression pattern; designing a "generation-discrimination" alternating optimization solution based on a Nash equilibrium capability of an enhanced generative adversarial model; and designing an objective function of the model by utilizing labeled and unlabeled samples.

8. The target sample recognition method according to claim 3, wherein the performing class prediction on the unlabeled data by using the enhanced discriminator comprises:
selecting all the discriminators ($D_i^{opt}$, i=1, . . . , N), selecting any piece of data ($\tilde{x}$) from an unlabeled raw disease data set, and inputting the any piece of data ($\tilde{x}$) into each class of discriminator, wherein each discriminator determines a class ($v_1, V_2, \ldots V_N$) of the data, and outputs a number between 0 and 1, a number closer to 1 means a higher confidence level indicating that the class is determined, and if there are multiple output values close to 1, it indicates that training of the generator does not reach an optimal state, and training needs to continue, $$0 \leq D_i^{opt}(\tilde{x}) \leq 1, i-1 \ldots N$$

$$y_k = \arg\max_i \{D_1^{opt}(\tilde{x}), \ldots D_i^{opt}(\tilde{x}), \ldots D_N^{opt}(\tilde{x})\}$$

by analogy, each piece of unlabeled data in the original data set becomes labeled data after the foregoing operation is performed on the unlabeled data.

9. The target sample recognition method according to claim 3, wherein training an enhanced discriminator network comprises:
for a sample including N classes, N generative adversarial networks are trained one by one in a model training process;
for an $i^{th}$ channel of generative adversarial network, only data of a corresponding $i^{th}$ class is input, for the $i^{th}$ channel of generative adversarial network, a corresponding objective function for training an optimal discriminator is as follows:

$$D_{opt} = \arg\min_D \text{Loss}(D) = \arg\max_D V(G, D)$$

$$V(G, D) = E_{x \sim P_{data}}(D(x)) - E_{x \sim P_G}(D(\tilde{x})) - \lambda E_{x \sim P_{penalty}}(\|\nabla_x D(x)\| - 1)^2,$$

where Loss (G) represents a loss function of the generator G, the loss function measures a difference between real data ($P_{data}(x)$) and generated data ($P_G(x)$);
wherein a parameter $\theta_D$ of the discriminator network D is initialized, and a quantity $n_D$ of iterations of training the discriminator is set, when the discriminator D is trained, in each iteration, several pieces of data $\{x^1, x^2, x^3, \ldots, x^m\}$ are sampled from the real data, and several pieces of data $\{z^1, z^2, z^3, \ldots, z^m\}$ are sampled from noise data, several pieces of generated data $\{\widetilde{x^1}, \widetilde{x^2}, \widetilde{x^3}, \ldots \widetilde{x^m}\}$ are obtained by using the generator, where $\widetilde{x^i} = G(z^i)$, several pieces of penalty data $\{\widehat{x^1}, \widehat{x^2}, \widehat{x^3}, \ldots \widehat{x^m}\}$ are calculated, where $\widehat{x^i} = \epsilon x^i + (1-\epsilon)\widetilde{x^i}$, and $\epsilon$ is a random number between 0 and 1, and then the parameter is updated:

$$\theta_D \leftarrow \theta_D + \eta \cdot \nabla_{\theta_D} \tilde{V}(G, D)$$

the remaining (N−1) enhanced discriminators are trained by using the same method to form an enhanced discriminator group that includes the N enhanced discriminators.

10. The target sample recognition method according to claim 9, wherein performing network training on the enhanced generator comprises:
the multi-channel generative adversarial network also includes N enhanced generators, training data is classified into N classes by class, and each class of data is used to train a corresponding enhanced generator, an objective function for training an optimal generator is as follows:

$$G_{opt} = \arg\min_G \max_D V(G, D),$$

a parameter $\theta_G$ of a generator network G is initialized, and a quantity $n_G$ of iterations of training the generator is preset, pieces of data $\{z^1, z^2, z^3, \ldots, z^m\}$ are then sampled from the noise data, and then the parameter is updated:

$$\theta_G \leftarrow \theta_G - \eta \cdot \nabla_{\theta_G} \tilde{V}(G, D).$$

11. The target sample recognition method according to claim 3, wherein generating new labeled data by using the enhanced generator comprises:
after the trained multi-channel generative adversarial network is obtained, all the enhanced generators ($G_i^{opt}$, i=1, . . . , N) are selected, for each enhanced network, one group of noise data is input to generate a group of new labeled data, and a label class of the group of new labeled data is a class corresponding to the generator:

$$X_i^{new} = G_i^{opt}(Z_i), i=1 \ldots N,$$

where $X_i^{new}$ represents newly generated data of an $i^{th}$ class, and $Z_i$ represents initialization noise of the $i^{th}$ class, by analogy, new labeled data is generated after the same operation is performed on each generator.

12. The target sample recognition method according to claim 3, wherein classifying the target sample based on the discriminator in the multi-channel generative adversarial network comprises:

the trained multi-channel generative adversarial network includes N enhanced generative adversarial networks, all the enhanced discriminators are selected to form an enhanced discriminator array ($D^s$, s=1, . . . , N), the N enhanced discriminators respectively correspond to N classes of disease data, any test sample ($d_k$) is selected and is input into each enhanced discriminator ($D^s$), each enhanced discriminator ($D^s$) correspondingly outputs a number between 0 and 1 for the input sample ($d_k$), a larger number indicates a higher confidence level indicating that the discriminator determines a class of the test sample as a corresponding class, for output values from the N enhanced discriminators for a test sample, only one output value is close to 1, and the other output values are all close to 0, the class of the test sample ($d_k$) is predicted as a sample of the $j^{th}$ class of a disease, the foregoing operation is repeated for each test sample in a test set, to classify each sample.

* * * * *